US011494895B2

(12) United States Patent
Nie et al.

(10) Patent No.: US 11,494,895 B2
(45) Date of Patent: Nov. 8, 2022

(54) DETECTING DEFECTS IN ARRAY REGIONS ON SPECIMENS

(71) Applicant: KLA Corporation, Milpitas, CA (US)

(72) Inventors: Siqing Nie, Shanghai (CN); Chunwei Song, Shanghai (CN); Zhuang Liu, Shanghai (CN); Weifeng Zhou, Shanghai (CN)

(73) Assignee: KLA Corp., Milpitas, CA (US)

( * ) Notice: Subject to any disclaimer, the term of this patent is extended or adjusted under 35 U.S.C. 154(b) by 143 days.

(21) Appl. No.: 17/003,452

(22) Filed: Aug. 26, 2020

(65) Prior Publication Data

US 2021/0256675 A1 Aug. 19, 2021

Related U.S. Application Data

(60) Provisional application No. 63/061,735, filed on Aug. 5, 2020, provisional application No. 62/976,945, filed on Feb. 14, 2020.

(51) Int. Cl.
*G01N 21/95* (2006.01)
*G06T 7/00* (2017.01)
*G01N 23/2251* (2018.01)

(52) U.S. Cl.
CPC ......... *G06T 7/001* (2013.01); *G01N 21/9501* (2013.01); *G01N 23/2251* (2013.01); *G06T 2207/30148* (2013.01)

(58) Field of Classification Search
CPC .......... G06T 7/001; G06T 2207/30148; G01N 21/9501; G01N 23/2251
USPC .............................. 356/237.2–237.6; 382/149
See application file for complete search history.

(56) References Cited

U.S. PATENT DOCUMENTS

| 7,570,796 | B2 | 8/2009 | Zafar et al. |
| 7,676,077 | B2 | 3/2010 | Kulkarni et al. |
| 7,711,177 | B2 * | 5/2010 | Leslie ................ G01N 21/9501 702/108 |
| 8,664,594 | B1 | 4/2014 | Jiang et al. |
| 8,692,204 | B2 | 4/2014 | Kojima et al. |
| 8,698,093 | B1 | 4/2014 | Gubbens et al. |
| 8,716,662 | B1 | 5/2014 | MacDonald et al. |

(Continued)

FOREIGN PATENT DOCUMENTS

KR 10-0808652 2/2008

OTHER PUBLICATIONS

International Search Report for PCT/US2021/016115 dated May 21, 2021.

*Primary Examiner* — Isiaka O Akanbi
(74) *Attorney, Agent, or Firm* — Ann Marie Mewherter

(57) ABSTRACT

Methods and systems for detecting defects in an array region on a specimen are provided. One method includes determining a center of a page break in output generated by an inspection subsystem for a specimen in an array region. The page break separates cell regions in the array region, and the cell regions include repeating patterned features. The method also includes determining an offset between the center of the page break in the output and a center of the page break in a design for the specimen and identifying portions of the output that correspond to care areas in the array region based on the offset. In addition, the method includes detecting defects in the array region by applying a defect detection method to the portions of the output that correspond to the care areas.

20 Claims, 7 Drawing Sheets

(56) References Cited

U.S. PATENT DOCUMENTS

| | | |
|---|---|---|
| 9,053,527 B2 | 6/2015 | Lang et al. |
| 11,308,606 B2 * | 4/2022 | Huang .................... G06T 7/11 |
| 2003/0228050 A1 | 12/2003 | Geshel et al. |
| 2009/0037134 A1 * | 2/2009 | Kulkarni ............ G01N 21/9501 |
| | | 702/127 |
| 2009/0067703 A1 | 3/2009 | Lin et al. |
| 2011/0142327 A1 | 6/2011 | Chen et al. |
| 2011/0170091 A1 * | 7/2011 | Chang ................ G01N 21/9501 |
| | | 356/237.5 |
| 2012/0141013 A1 | 6/2012 | Gao et al. |
| 2013/0114880 A1 * | 5/2013 | Matsumoto .......... G01N 21/956 |
| | | 382/149 |
| 2013/0148116 A1 * | 6/2013 | Tanaka ............. G01N 21/95623 |
| | | 356/237.5 |
| 2013/0343632 A1 * | 12/2013 | Urano .................... G06T 7/001 |
| | | 382/149 |
| 2014/0037187 A1 * | 2/2014 | Marcuccilli ............ G06T 7/001 |
| | | 382/149 |

* cited by examiner

DETECTING DEFECTS IN ARRAY REGIONS ON SPECIMENS

BACKGROUND OF THE INVENTION

1. Field of the Invention

The present invention generally relates to methods and systems for detecting defects in an array region on a specimen in the semiconductor arts.

2. Description of the Related Art

The following description and examples are not admitted to be prior art by virtue of their inclusion in this section.

Fabricating semiconductor devices such as logic and memory devices typically includes processing a specimen such as a semiconductor wafer using a number of semiconductor fabrication processes to form various features and multiple levels of the semiconductor devices. For example, lithography is a semiconductor fabrication process that typically involves transferring a pattern to a resist arranged on a semiconductor wafer. Additional examples of semiconductor fabrication processes include, but are not limited to, chemical-mechanical polishing, etch, deposition, and ion implantation. Multiple semiconductor devices may be fabricated in an arrangement on a semiconductor wafer and then separated into individual semiconductor devices.

Inspection using either optical or electron beam imaging is an important technique for debugging semiconductor manufacturing processes, monitoring process variations, and improving production yield in the semiconductor industry. With the ever decreasing scale of modern integrated circuits (ICs) as well as the increasing complexity of the manufacturing process, inspection becomes more and more difficult.

In each processing step performed on a semiconductor wafer, the same circuit pattern is printed in each die. Most wafer inspection systems take advantage of this fact and use a relatively simple die-to-die comparison to detect defects on the wafer. However, the printed circuit in each die may include many areas of patterned features that repeat in the x or y direction such as the areas of DRAM, SRAM, or FLASH. This type of area is commonly referred to as an "array area" (the rest of the areas are called "random" or "logic areas"). To achieve better sensitivity, advanced inspection systems employ different strategies for inspecting the array areas and the random or logic areas.

Array detection algorithms are designed to achieve relatively high sensitivity for DRAM cell regions by making use of the repeatability of the cell region. For example, inspection systems configured for array area inspection often perform a cell-to-cell comparison where images for different cells in an array area in the same die are subtracted from one another and the differences are examined for defects. This array inspection strategy can achieve much higher sensitivity in array areas than random inspection (which is generally performed by subtracting an image for one die from an image for another die) because it avoids noise caused by die-to-die variation.

For DRAM cell regions, there are two commonly used ways to ensure the repeatability of the cells within those regions can be successfully used to detect defects in the cells. In the first way, the inspection uses legacy inspection with alignment of inspection images to design. To overcome stage uncertainly in such methods, the array care areas are usually shrunk by a certain amount to ensure that pixels inside the array care area are repeating. For the cell edge region, random care areas and random type inspection are used for detection. In another way, alignment to design (e.g., pixel to design alignment (PDA)) is used to place care areas. Alignment targets on the page break are used for the alignment, and array care areas can be placed exactly on the repeating pattern region. In this method, good PDA alignment performance requires good targets.

There are, however, several disadvantages to the array detection methods described above. For example, compared with random detection algorithms, array detection has a much higher sensitivity due to 1) neighboring regions on the same die usually have similar processing compared to neighboring die images (used for the reference image for random detection), hence less noise is introduced and 2) there is no need for alignment since the test and reference images can come from the same image frame. However, array detection requires pixels inside care areas to be responsive to patterned features repeating in the x direction on the specimen. Legacy care area placement accuracy is determined by stage uncertainty. Array care areas must be smaller than the cell regions by a certain amount to avoid inner cell defect detection becoming polluted by the non-repeating page break region when the care area placement accuracy cannot meet the requirements. As a result, in DRAM layers, cell edge pixels can only be inspected by a random inspection algorithm, instead of a more powerful array detection. Consequently, sensitivity drops at the DRAM cell edge. PDA alignment can help to correct stage uncertainty for logic layers. However, for DRAM layers, current design-based alignment may not work in some layers since there's not enough pattern suitable for alignment.

Accordingly, it would be advantageous to develop systems and methods for inspection of array regions on specimens that do not have one or more of the disadvantages described above.

SUMMARY OF THE INVENTION

The following description of various embodiments is not to be construed in any way as limiting the subject matter of the appended claims.

One embodiment relates to a system configured for detecting defects in an array region on a specimen. The system includes an inspection subsystem that includes at least an energy source and a detector. The energy source is configured to generate energy that is directed to a specimen, and the detector is configured to detect energy from the specimen and to generate output responsive to the detected energy. The system also includes one or more computer subsystems configured for determining a center of a page break in output generated for the specimen in an array region. The page break separates cell regions in the array region, and the cell regions include repeating patterned features. The one or more computer subsystems are also configured for determining an offset between the center of the page break in the output and a center of the page break in a design for the specimen and identifying portions of the output that correspond to care areas in the array region based on the offset. In addition, the one or more computer subsystems are configured for detecting defects in the array region by applying a defect detection method to the portions of the output that correspond to the care areas. The system may be further configured as described herein.

Another embodiment relates to a computer-implemented method for detecting defects in an array region on a specimen. The method includes determining a center of a page break in output generated by an inspection subsystem for a specimen in an array region. The page break separates cell regions in the array region, and the cell regions include repeating patterned features. The inspection subsystem is configured as described above. The method also includes the determining the offset, identifying the portions, and detecting the defects steps described above. The determining the center, determining the offset, identifying the portions, and detecting the defects steps are performed by one or more computer subsystems coupled to the inspection subsystem. Each of the steps of the method described above may be performed as described further herein. In addition, the embodiment of the method described above may include any other step(s) of any other method(s) described herein. The method described above may be performed by any of the systems described herein.

Another embodiment relates to a non-transitory computer-readable medium storing program instructions executable on a computer system for performing a computer-implemented method for detecting defects in an array region on a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
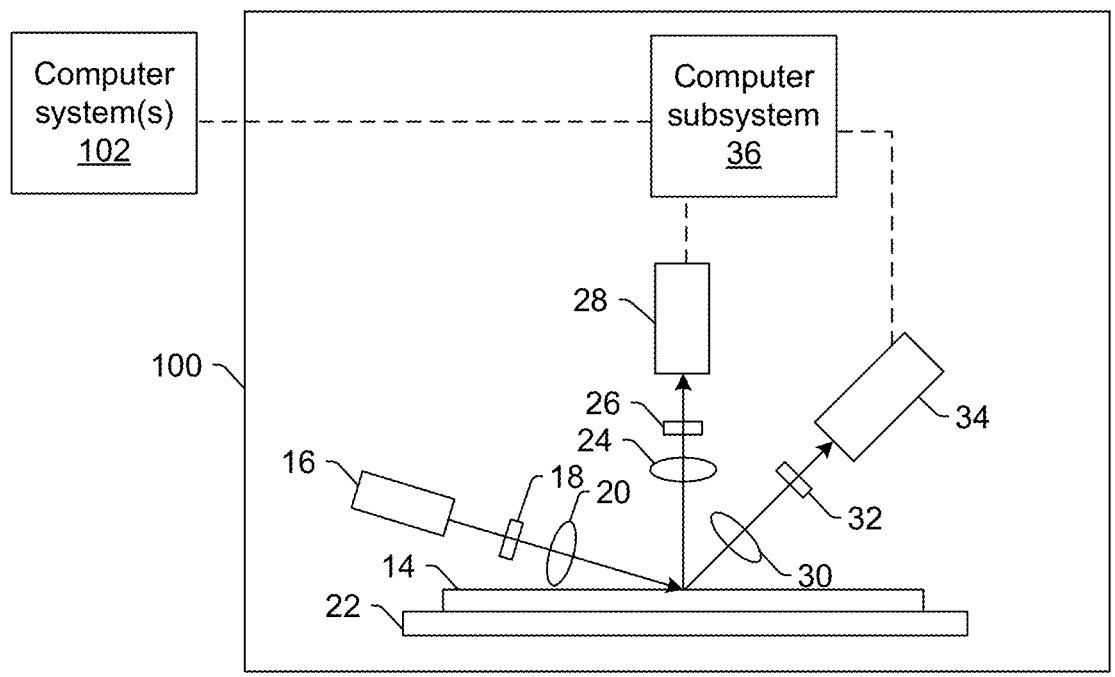
FIGS. 1 and 1a are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

"Nuisances" (which is sometimes used interchangeably with "nuisance defects") as that term is used herein is generally defined as defects that a user does not care about and/or events that are detected on a specimen but are not really actual defects on the specimen. Nuisances that are not actually defects may be detected as events due to non-defect noise sources on a specimen (e.g., grain in metal lines on the specimen, signals from underlaying layers or materials on the specimen, line edge roughness (LER), relatively small critical dimension (CD) variation in patterned attributes, thickness variations, etc.) and/or due to marginalities in the inspection system itself or its configuration used for inspection.

The term "defects of interest (DOIs)" as used herein is defined as defects that are detected on a specimen and are really actual defects on the specimen. Therefore, the DOIs are of interest to a user because users generally care about how many and what kind of actual defects are on specimens being inspected. In some contexts, the term "DOI" is used to refer to a subset of all of the actual defects on the specimen, which includes only the actual defects that a user cares about. For example, there may be multiple types of DOIs on any given specimen, and one or more of them may be of greater interest to a user than one or more other types. In the context of the embodiments described herein, however, the term "DOIs" is used to refer to any and all real defects on a specimen.

The terms "design" and "design data" as used herein generally refer to the physical design (layout) of an IC and data derived from the physical design through complex simulation or simple geometric and Boolean operations. In addition, an image of a reticle acquired by a reticle inspection system and/or derivatives thereof can be used as a "proxy" or "proxies" for the design. Such a reticle image or a derivative thereof can serve as a substitute for the design layout in any embodiments described herein that use a design. The design may include any other design data or design data proxies described in commonly owned U.S. Pat. No. 7,570,796 issued on Aug. 4, 2009 to Zafar et al. and U.S. Pat. No. 7,676,077 issued on Mar. 9, 2010 to Kulkarni et al., both of which are incorporated by reference as if fully set forth herein. In addition, the design data can be standard cell library data, integrated layout data, design data for one or more layers, derivatives of the design data, and full or partial chip design data.

In general, however, the design information or data cannot be generated by imaging a wafer with a wafer inspection system. For example, the design patterns formed on the wafer may not accurately represent the design for the wafer and the wafer inspection system may not be capable of generating images of the design patterns formed on the wafer with sufficient resolution such that the images could be used to determine information about the design for the wafer. Therefore, in general, the design information or design data cannot be generated using a physical wafer. In addition, the "design" and "design data" described herein refers to information and data that is generated by a semiconductor device designer in a design process and is therefore available for use in the embodiments described herein well in advance of printing of the design on any physical wafers.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

In general, the embodiments described herein are configured for detecting defects in an array region on a specimen.

Some embodiments are configured for binning-based solutions for DRAM edge cell sensitivity improvements. The embodiments may also generally relate to location-based cell region binning methods for DRAM inspection with saturated page breaks. Although some embodiments are described herein with respect to dynamic random access memory (DRAM) devices, the embodiments described herein can be used for inspection of any type of memory devices and/or devices containing memory regions.

Fabrication processes used to form semiconductor memory devices such as DRAM usually perform worse on DRAM edge cell regions than inner cell regions, meaning that the fabrication processes usually result in more defects in the edge cell regions compared to the inner cell regions. In some layers, critical DOIs may be located relatively close to the cell boundary based on feedback from DRAM manufacturers.

Due to stage uncertainty in inspection tools, array care areas cannot be placed substantially accurately on repeating DRAM cell regions in images, and the care areas must be shrunk to ensure the sensitivity inside the care areas. Array care areas can be generally defined as care areas for array regions of memory devices, where array regions are defined as regions of a semiconductor device containing only patterned structures arranged in substantially small, repeating cells, compared to logic regions that contain at least some non-repeating patterned structures. Hence, the sensitivity of inspection in edge cell regions is sacrificed.

The embodiments described herein provide a method for improving the edge cell region inspection sensitivity by enabling substantially accurate placement of array care areas and enabling array detection algorithms on entire cell regions. Furthermore, the embodiments described herein can separate the entire cell region pixels into different bins giving the user the flexibility to set different sensitivities for different noise level regions independently.

In some embodiments, the specimen is a wafer. The wafer may include any wafer known in the semiconductor arts. Although some embodiments may be described herein with respect to a wafer or wafers, the embodiments are not limited in the specimens for which they can be used. For example, the embodiments described herein may be used for specimens such as reticles, flat panels, personal computer (PC) boards, and other semiconductor specimens.

One embodiment of a system configured for detecting defects in an array region on a specimen is shown in FIG. 1. The system includes inspection subsystem 100 coupled to one or more computer subsystems 102. In the embodiments shown in FIG. 1, the inspection subsystem is configured as a light-based inspection subsystem. However, in other embodiments described herein, the inspection subsystem is configured as an electron beam or charged particle beam based inspection subsystem.

In general, the inspection subsystems described herein include at least an energy source and a detector. The energy source is configured to generate energy that is directed to a specimen. The detector is configured to detect energy from the specimen and to generate output responsive to the detected energy.

In a light-based inspection subsystem, the energy directed to the specimen includes light, and the energy detected from the specimen includes light. For example, in the embodiment of the system shown in FIG. 1, the inspection subsystem includes an illumination subsystem configured to direct light to specimen 14. The illumination subsystem includes at least one light source. For example, as shown in FIG. 1, the illumination subsystem includes light source 16. In one embodiment, the illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to specimen 14 at an oblique angle of incidence. The oblique angle of incidence may include any suitable oblique angle of incidence, which may vary depending on, for instance, characteristics of the specimen and the defects to be detected on the specimen.

The illumination subsystem may be configured to direct the light to the specimen at different angles of incidence at different times. For example, the inspection subsystem may be configured to alter one or more characteristics of one or more elements of the illumination subsystem such that the light can be directed to the specimen at an angle of incidence that is different than that shown in FIG. 1. In one such example, the inspection subsystem may be configured to move light source 16, optical element 18, and lens 20 such that the light is directed to the specimen at a different oblique angle of incidence or a normal (or near normal) angle of incidence.

In some instances, the inspection subsystem may be configured to direct light to the specimen at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example in some instances, optical element 18 may be configured as a spectral filter and the properties of the spectral filter can be changed in a variety of different ways (e.g., by swapping out one spectral filter with another) such that different wavelengths of light can be directed to the specimen at different times. The illumination subsystem may have any other suitable configuration known in the art for directing the light having different or the same characteristics to the specimen at different or the same angles of incidence sequentially or simultaneously.

Light source 16 may include a broadband plasma (BBP) light source. In this manner, the light generated by the light source and directed to the specimen may include broadband light. However, the light source may include any other suitable light source such as a laser. The laser may include any suitable laser known in the art and may be configured to generate light at any suitable wavelength(s) known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more of the elements of the illumination subsystem based on the type of illumination to be used for inspection.

The inspection subsystem may also include a scanning subsystem configured to change the position on the specimen to which the light is directed and from which the light is detected and possibly to cause the light to be scanned over the specimen. For example, the inspection subsystem may include stage 22 on which specimen 14 is disposed during inspection. The scanning subsystem may include any suitable mechanical and/or robotic assembly (that includes stage 22) that can be configured to move the specimen such that the light can be directed to and detected from different positions on the specimen. In addition, or alternatively, the inspection subsystem may be configured such that one or more optical elements of the inspection subsystem perform some scanning of the light over the specimen such that the light can be directed to and detected from different positions on the specimen. In instances in which the light is scanned over the specimen, the light may be scanned over the specimen in any suitable fashion such as in a serpentine-like path or in a spiral path.

The inspection subsystem further includes one or more detection channels. At least one of the detection channel(s) includes a detector configured to detect light from the specimen due to illumination of the specimen by the system and to generate output responsive to the detected light. For example, the inspection subsystem shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., reflected light).

As further shown in FIG. 1, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the inspection subsystem that includes two detection channels, the inspection subsystem may include a different number of detection channels (e.g., only one detection channel or two or more detection channels). In one such instance, the detection channel formed by collector 30, element 32, and detector 34 may form one side channel as described above, and the inspection subsystem may include an additional detection channel (not shown) formed as another side channel that is positioned on the opposite side of the plane of incidence. Therefore, the inspection subsystem may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the inspection subsystem may also include two or more side channels configured as described above. As such, the inspection subsystem may include at least three channels (i.e., one top channel and two side channels), and each of the at least three channels has its own collector, each of which is configured to collect light at different scattering angles than each of the other collectors.

As described further above, each of the detection channels included in the inspection subsystem may be configured to detect scattered light. Therefore, the inspection subsystem shown in FIG. 1 may be configured for dark field (DF) inspection of specimens. However, the inspection subsystem may also or alternatively include detection channel(s) that are configured for bright field (BF) inspection of specimens. In other words, the inspection subsystem may include at least one detection channel that is configured to detect light specularly reflected from the specimen. Therefore, the inspection subsystems described herein may be configured for only DF, only BF, or both DF and BF inspection. Although each of the collectors are shown in FIG. 1 as single refractive optical elements, it is to be understood that each of the collectors may include one or more refractive optical element(s) and/or one or more reflective optical element(s).

The one or more detection channels may include any suitable detectors known in the art. For example, the detectors may include photo-multiplier tubes (PMTs), charge coupled devices (CCDs), and time delay integration (TDI) cameras. The detectors may also include non-imaging detectors or imaging detectors. If the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels may be signals or data, but not image signals or image data. In such instances, a computer subsystem such as computer subsystem 36 that forms part of an inspection system with the inspection subsystem may be configured to generate images of the specimen from the non-imaging output of the detectors. However, in other instances, the detectors may be configured as imaging detectors that are configured to generate imaging signals or image data. Therefore, the inspection subsystem may be configured to generate images in a number of ways.

It is noted that FIG. 1 is provided herein to generally illustrate a configuration of an inspection subsystem that may be included in the system embodiments described herein. Obviously, the inspection subsystem configuration described herein may be altered to optimize the performance of the inspection subsystem as is normally performed when designing a commercial inspection system. In addition, the systems described herein may be implemented using an existing inspection system (e.g., by adding functionality described herein to an existing inspection system) such as the 29xx/39xx series of tools that are commercially available from KLA, Milpitas, Calif. For some such systems, the methods described herein may be provided as optional functionality of the inspection system (e.g., in addition to other functionality of the inspection system). Alternatively, the inspection system described herein may be designed "from scratch" to provide a completely new inspection system.

Computer subsystem 36 may be coupled to the detectors of the inspection subsystem in any suitable manner (e.g., via one or more transmission media, which may include "wired" and/or "wireless" transmission media) such that the computer subsystem can receive the output generated by the detectors. Computer subsystem 36 may be configured to perform a number of functions using the output of the detectors as described further herein. The computer subsystem coupled to the inspection subsystem may be further configured as described herein.

The computer subsystem coupled to the inspection subsystem (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems. For example, computer subsystem 36 may be coupled to computer system(s) 102 as shown by the dashed line in FIG. 1 by any suitable transmission media, which may include any suitable wired and/or wireless transmission media known in the art. Two or more of such computer subsystems may also be effectively coupled by a shared computer-readable storage medium (not shown).

Although the inspection subsystem is described above as being an optical or light-based inspection subsystem, in another embodiment, the inspection subsystem is configured as an electron beam based inspection subsystem. In an electron beam type inspection subsystem, the energy directed to the specimen includes electrons, and the energy detected from the specimen includes electrons. In one such embodiment shown in FIG. 1a, the inspection subsystem includes electron column 122, and the system includes computer subsystem 124 coupled to the inspection subsystem. Computer subsystem 124 may be configured as described above. In addition, such an inspection subsystem may be coupled to another one or more computer subsystems in the same manner described above and shown in FIG. 1.

Figure 1A:
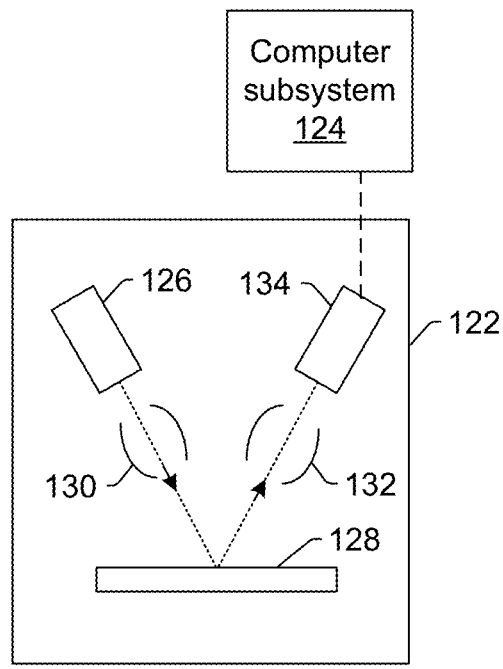

As also shown in FIG. 1a, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 1a as being configured such that the electrons are directed to the specimen at an oblique angle of incidence and are scattered from the specimen at another oblique angle, the electron beam may be directed to and scattered from the specimen at any suitable angles. In addition, the electron beam inspection subsystem may be configured to use multiple modes to generate output for the specimen as described further herein (e.g., with different illumination angles, collection angles, etc.). The multiple modes of the electron beam inspection subsystem may be different in any output generation parameters of the inspection subsystem.

Computer subsystem 124 may be coupled to detector 134 as described above. The detector may detect electrons returned from the surface of the specimen thereby forming electron beam images of (or other output for) the specimen. The electron beam images may include any suitable electron beam images. Computer subsystem 124 may be configured to perform any step(s) described herein. A system that includes the inspection subsystem shown in FIG. 1a may be further configured as described herein.

It is noted that FIG. 1a is provided herein to generally illustrate a configuration of an electron beam inspection subsystem that may be included in the embodiments described herein. As with the optical inspection subsystem described above, the electron beam inspection subsystem configuration described herein may be altered to optimize the performance of the inspection subsystem as is normally performed when designing a commercial inspection system. In addition, the systems described herein may be implemented using an existing inspection system (e.g., by adding functionality described herein to an existing inspection system) such as the tools that are commercially available from KLA. For some such systems, the methods described herein may be provided as optional functionality of the system (e.g., in addition to other functionality of the system). Alternatively, the system described herein may be designed "from scratch" to provide a completely new system.

Although the inspection subsystem is described above as being a light or electron beam inspection subsystem, the inspection subsystem may be an ion beam inspection subsystem. Such an inspection subsystem may be configured as shown in FIG. 1a except that the electron beam source may be replaced with any suitable ion beam source known in the art. In addition, the inspection subsystem may include any other suitable ion beam system such as those included in commercially available focused ion beam (FIB) systems, helium ion microscopy (HIM) systems, and secondary ion mass spectroscopy (SIMS) systems.

As further noted above, the inspection subsystem may be configured to have multiple modes. In general, a "mode" can be defined by the values of parameters of the inspection subsystem used to generate output for the specimen. Therefore, modes that are different may be different in the values for at least one of the optical or electron beam parameters of the inspection subsystem (other than position on the specimen at which the output is generated). For example, for a light-based inspection subsystem, different modes may use different wavelengths of light. The modes may be different in the wavelengths of light directed to the specimen as described further herein (e.g., by using different light sources, different spectral filters, etc.) for different modes. In another embodiment, different modes may use different illumination channels. For example, as noted above, the inspection subsystem may include more than one illumination channel. As such, different illumination channels may be used for different modes.

The multiple modes may also be different in illumination and/or collection/detection. For example, as described further above, the inspection subsystem may include multiple detectors. Therefore, one of the detectors may be used for one mode and another of the detectors may be used for another mode. Furthermore, the modes may be different from each other in more than one way described herein (e.g., different modes may have one or more different illumination parameters and one or more different detection parameters). The inspection subsystem may be configured to scan the specimen with the different modes in the same scan or different scans, e.g., depending on the capability of using multiple modes to scan the specimen at the same time.

The one or more computer subsystems are configured for determining a center of a page break in output generated for the specimen in an array region. The page break separates cell regions in the array region, and the cell regions include repeating patterned features. For example, "page breaks" are generally defined in the art as regions of a die separating substantially continuous regions of physical memory. Each of the continuous regions of physical memory may be commonly referred to as a "page frame." Each of the page frames may include one or more cell regions. In one embodiment, the array region forms part of a memory device being fabricated on the specimen. The memory device may include any memory device known in the art including DRAM. For example, during DRAM inspection, the computer subsystem(s) may calculate the optical-based page break center.

In one embodiment, the output corresponding to the page break is saturated. In other words, due to the differences between the page breaks and patterned structures in cell regions that they surround, the output generated for the page breaks may be substantially different than that generated for the cell regions. In addition, the configuration of the inspection subsystem and the differences between the page breaks and the cell regions may result in the detector(s) detecting light from the page breaks being saturated. For example, even if the inspection subsystem could image the page breaks and patterned features included in the page breaks, since the inspection subsystem will be optimized for generating output in the cell regions rather than the page breaks, the differences between the page breaks and the cell regions may cause the output from the page breaks to be saturated. In this manner, any patterned features formed in or by the page breaks can be undetectable in images generated by the inspection subsystem. As such, when the detector(s) become saturated, the detector(s) may not yield output that can be used for pattern detection and/or alignment. In other words, the output generated for the page breaks may be saturated thereby rendering the output unresponsive to any possible alignment features or structures formed therein or by the page breaks.

In some embodiments, the output generated in the array region is not responsive to any features in the page break suitable for image alignment, and the cell regions do not contain any features that are suitable for the image alignment. For example, as described above, since the output generated for the page breaks may be saturated, the output may not be responsive to any alignment patterns or features formed in or by the page breaks. In addition, the cell regions contain repeating patterned features that are generally unsuitable for pattern alignment because they do not contain sufficiently unique patterns or patterns that have one or more unique characteristics such as a unique spacing from other patterned features. Therefore, in the array region, it may not be possible to generate output that is responsive to patterns that can be used for alignment when page breaks are saturated.

As described further herein, however, the page break center is determined for alignment purposes. For example, the page break center based alignment described herein enables pixel-to-design alignment (PDA) for cases where not enough pattern is available for classical PDA. In this manner, the embodiments described herein enable the DRAM binning methods described further herein that improve sensitivity by accurately placing care areas for pattern deficiency alignment cases.

The center of the page break may be determined as described further herein, and the output in which the center of the page break is determined may include specimen images or any other output described herein. The output may include any of the output generated for the specimen including any test (or inspection) images generated for the specimen. In addition, determining the center of the page break may be performed multiple times for a single specimen (e.g., for every test image generated for a specimen, for every test image generated for only array areas on a specimen, for two or more test images generated for an array area on a specimen, etc.). In some instances, determining a page break center may be performed for every test image generated in an array area on a specimen. In other instances, the page break center may be determined in fewer than all of the test images, and the offset determined based on a page break center may be used as described herein for multiple test images.

In one embodiment, during a setup phase, the computer subsystem(s) are configured for identifying one or more page break targets in a setup image acquired by the inspection subsystem for the specimen or another specimen, acquiring information for the one or more page break targets from the design for the specimen, determining one or more characteristics of the one or more page break targets from the information, and storing the identified one or more page break targets and the determined one or more characteristics of the one or more page break targets in a storage medium. For example, the overall procedure performed by the embodiments described herein may include DRAM setup and inspection. During DRAM setup, the computer subsystem(s) may find page break target(s) in a setup optical image, which may be performed in any of the manners described herein. The specimen used in the setup phase may be the specimen that will be inspected or another specimen, i.e., a setup specimen, having layer(s) formed thereon that are the same as the layer(s) formed on specimen at the time of inspection. The computer subsystem(s) may then acquire design information of the page break, which may be performed in any suitable manner known in the art, and calculate one or more characteristics of the page break such as design location of the page break center, page break width, and page break height, which may also be performed in any suitable manner known in the art. The computer subsystem(s) may further save the target(s) and the corresponding page break information into the PDA database or another suitable file having any suitable format in any suitable storage medium described herein or known in the art.

Identifying one or more page break targets in a setup image may include projecting a line or area in the setup image onto an axis and determining discontinuities in the line or area projected onto the axis as page breaks extending in a direction substantially perpendicular to the axis. In this manner, the method may include identifying page break targets using projection. Identifying the one or more page break targets may be used to indirectly identify the cell regions based on the assumption that portions of the images that do not correspond to page break targets correspond to cell regions. In this manner, the method may include projecting a line or swath of pixels onto the horizontal or vertical axis (depending on whether the method is identifying vertical or horizontal page breaks, respectively) and then finding the discontinuities in the line or swath.

In other embodiments, the page break target(s) in the setup image may be identified without projection. For example, the embodiments may include applying an algorithm such as a pattern recognition algorithm to the setup image to detect the spaces between the areas containing repeating patterns in the setup image as the page break target(s) thereby also effectively identifying the cell regions in the array region.

In some embodiments, determining the center of the page break includes determining a first center of the page break along a first dimension of the page break and determining a second center of the page break along a second dimension of the page break orthogonal to the first dimension. In this manner, the page break center may be determined in two orthogonal dimensions. The first and second centers of the page breaks in different dimensions of the page break may then be used to determine a center of the page break at an intersection of the page break in the two dimensions. The page break center may therefore be determined as the center of a page break from which the page break extends in two orthogonal dimensions. As such, the feature that is used for alignment herein may be much like a cross target, which are the best alignment candidates in the images generated for the array regions described herein, and can be selected automatically in the steps performed by the embodiments described herein. The centers of the page break in the first and second dimensions may be determined as described further herein.

Figure 6:
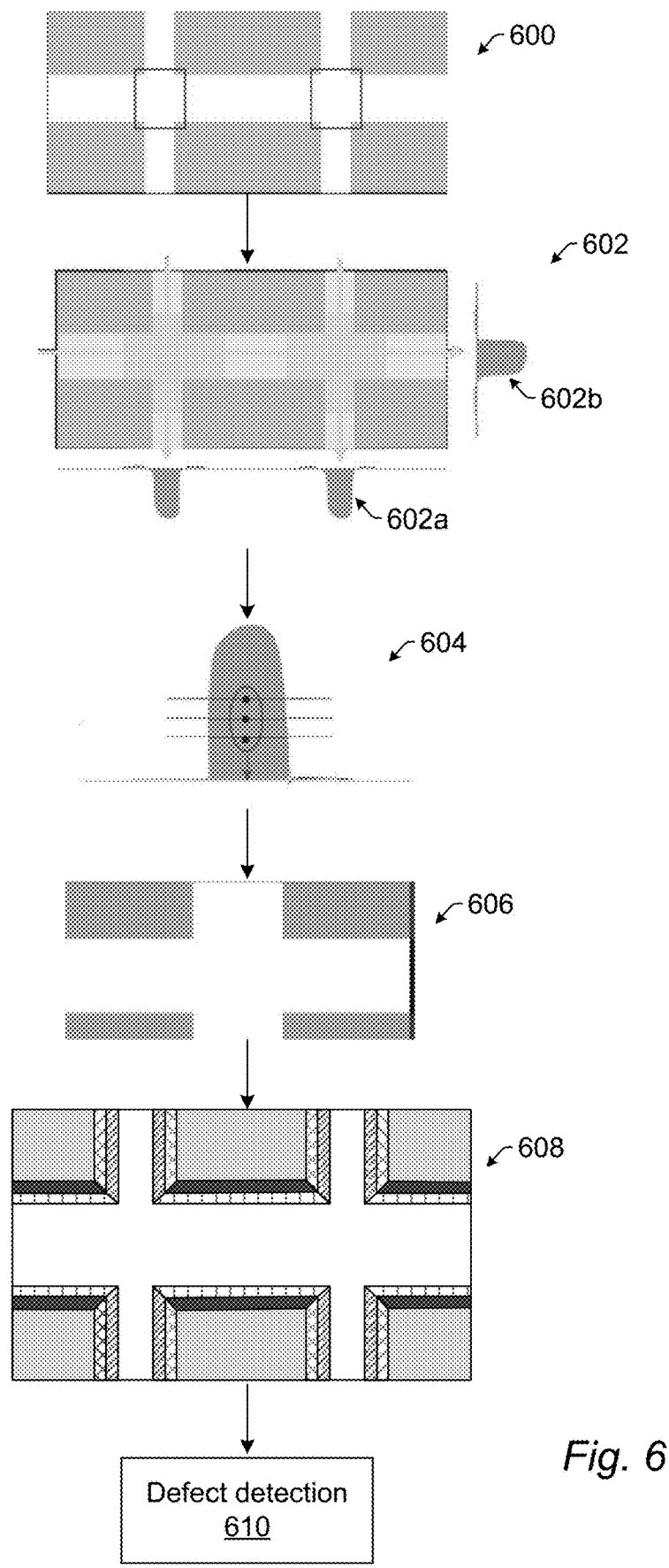

In another embodiment, determining the center of the page break includes image projection in first and second dimensions orthogonal to each other on the specimen. FIG. 6 illustrates one embodiment of DRAM binning-based defect detection. In this method, the computer subsystem(s) may acquire frame image and target with design information, as shown in step 600. The computer subsystem(s) may also perform image projection in two directions, as shown in step 602. In particular, the image projection may be performed in the x and y directions that are in the plane of the paper and orthogonal to each other. As shown in FIG. 6, projection in the x direction may include generating plot 602a of one or more characteristics such as signal, intensity, or signal-to-noise ratio of a line or a swath of pixels extending in the x direction as a function of position in the x direction. The differences in the light from the page breaks and the cell regions will cause dramatic shifts in the plot when the pixels transition from being responsive to light from the page breaks versus light from the cell regions. In this manner, the edges of the peaks shown in this plot can be designated as the edges of the page breaks extending in the opposite direction. In a similar manner, projection in the y direction may include generating plot 602b of one or more of the characteristics described above of a line or swath of pixels extending in the y direction as a function of position in the y direction. The edges of the peak shown in this plot can be designated as the edges of the page break extending in the opposite direction.

The computer subsystem(s) may then identify the page break center, as shown in step 604. As described above, the computer subsystem(s) may determine different page break centers for different portions of the page breaks extending in different directions. For example, the computer subsystem(s) may determine a center of the page break portion extending in the x direction and a center of the page break portion extending in the y direction. These centers may then be used to determine a center of the intersection of the page break from which the page break extends in two dimensions. In addition, the page break center may be determined for each page break intersection in an image. For example, for the page breaks shown in steps 600 and 602, two page break centers may be determined, one for the page break intersection on the left side of the image and one for the page break intersection on the right side of the image. In addition, as shown in step 604, the characteristic of the pixels in plots 602a and 602b generated by projection may not exhibit step function like values. Therefore, the center may be determined at multiple positions across the height of a peak, which may then be combined in some manner, e.g., by finding a mean or median of the different center positions, to find an overall center of the peak and thus the page break center in this direction. This page break center may then be used for other steps described herein.

Unlike the embodiments described herein, projection along one dimension has been applied as a pre-processing step to extract one-dimensional features from two-dimensional images. Such projection helps to reduce noise and less computation is needed. In contrast, in the embodiments described herein, the page break center is used as an anchor point (or alignment target) to calculate the offset between specimen images and design for alignment purposes. Determining the center of the page break from multiple instead of single cutlines, as shown in steps 602 and 604, makes the alignment result more robust.

In addition, in contrast to some currently used systems in which projection may be used to identify array areas in an image of a specimen, the projection described herein is not used to identify array areas, but to identify a center of the page break that is then used in subsequent steps for alignment purposes. This difference is significant in the case of saturated page break images. For example, when there is relatively high noise in the portions of the cell regions nearest to the page break and when the image of the page break is saturated, the edges of the cell regions and page breaks can be particularly difficult to detect. In addition, when the page break is saturated and the cell regions do not contain patterned features suitable for alignment, there may not be any features in the images that can be used for alignment except those edges. As such, alignment using pattern matching of specimen images to design or other array region images (e.g., rendered images from simulation) may be particularly difficult or even impossible because the edges of the page breaks and cell regions may be difficult to identify. This difficulty may introduce enough error in the alignment process to cause misalignment of care areas to inspection images and/or inspection images to other inspection images. Such alignment errors can therefore cause significant numbers of nuisances to be detected and can even cause the inspection process to fail completely (if the misalignment is significant enough). Significant numbers of detected nuisances can render the inspection results essentially useless if the nuisances cannot be separated from the DOIs. However, since the noise near the edges of the page breaks is expected to be substantially equal on opposite sides of the axis of symmetry of the page breaks in any one direction, the inventors have found that the center of the page break can be found relatively easily and repeatably using projection or other techniques and therefore are particularly suitable for use as alignment targets for the types of inspection described herein.

The one or more computer subsystems are also configured for determining an offset between the center of the page break in the output and a center of the page break in a design for the specimen. This offset may therefore be referred to herein as a PDA offset in that it is an offset between the output generated by the inspection subsystem for the specimen and the design for the specimen. The computer subsystem(s) may determine the PDA offset from output and design-based page break centers in any suitable manner, and the PDA offset may be expressed in any suitable manner (e.g., as a Cartesian offset, as a two-dimensional function, etc.). In this manner, optical or other images are aligned with design based on page break center locations in design and specimen images, which enables substantially accurate placement of design-based care areas in the specimen images as described further herein. Currently used methods involving aligning wafer optical images with a rendered image of design cannot achieve acceptable accuracy in the situation of limited features for alignment due to page break saturation.

Figure 2:
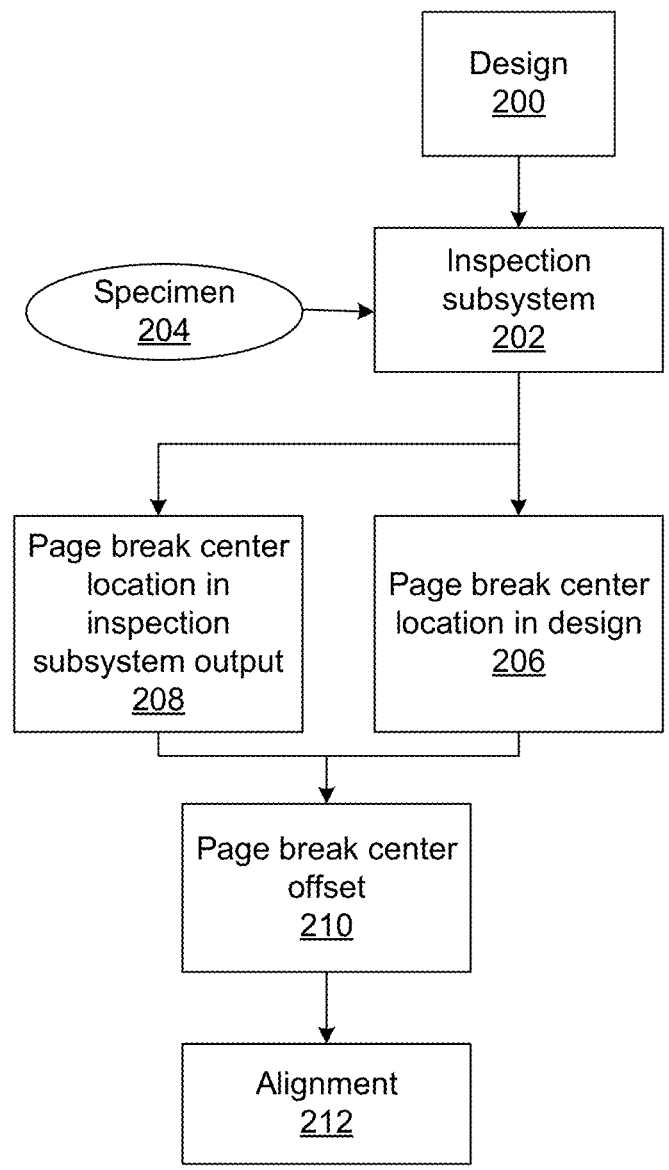
FIGS. 2-3 and 5-7 are flow charts illustrating embodiments of steps that may be performed for detecting defects in an array region on a specimen.

The one or more computer subsystems are further configured for identifying portions of the output that correspond to care areas in the array region based on the offset. For example, the computer subsystem(s) may place care areas based on the PDA offset. Placing the care areas based on the PDA offset may be performed for each frame of the images generated for the specimen. FIG. 2 shows one embodiment of steps that may be performed for specimen image alignment and care area placement with saturated page breaks. As shown in FIG. 2, the computer subsystem(s) may acquire design 200, which may be a chip design file having any suitable format known in the art. Inspection subsystem 202 may generate output for specimen 204, which may be performed as described herein or in any other suitable manner known in the art. Inspection subsystem 202 may have any configuration described herein. The computer subsystem(s) may determine page break center location in design 206 and page break center location in inspection subsystem output 208 (e.g., a specimen image), which may be performed as described herein. The computer subsystem(s) may then determine page break center offset 210 from the page break center locations in design and inspection system output, which may be performed as described further herein. In addition, the computer subsystem(s) may perform alignment 212 based on page break center offset 210.

Alignment 212 may include specimen image and care area alignment. In particular, the care area position(s) with respect to the design for the specimen will necessarily be known (since the positions of the cell regions in the design are known and the positions of the care areas with respect to the cell regions will be predetermined). Therefore, that information can be used in combination with the offset determined as described herein to determine positions of care areas within the specimen images. In this manner, the care areas will be aligned to the specimen image thereby identifying the portions of the image that correspond to the care areas. Step 606 shown in FIG. 6 also shows the computer subsystem(s) using the offset between design and specimen image page breaks to place care areas.

In one embodiment, the one or more computer subsystems are also configured for assigning pixels in the identified portions of the output to bins defined based on proximity of areas of interest (AOIs) in the care areas to edges of the cell regions. For example, after placing the cell region care areas as described above, each cell region may be segmented into a few (two or more) areas based on the distance from the page break, which correspond to different noise level regions. In this manner, based on expected noise across the cell region (which may be determined experimentally or theoretically in any suitable manner including from the projections described herein), a care area for a cell region can be separated into different AOIs such that areas that have higher noise are in one AOI and areas that have lower noise are in another AOI. In general, for the specimens and inspection subsystems described herein, the inspection subsystem will generate output that is noisier near the edges of the cell regions than the center of the cell regions. Therefore, AOIs and the bins defined based on them may include first AOIs that are adjacent to, near, or extending from at least one edge of the cell region and second AOIs that are spaced from the edges of the cell region. Such AOIs and their corresponding bins may be further configured as described herein.

The computer subsystem(s) may also generate a mask based on the care areas and the characteristics (e.g., size, position, etc.) of each bin. The computer subsystem(s) may then map the pixels in each bin to different groups thereby assigning pixels in the identified portions of the output to bins and, as described further herein, apply different detection based on their own signal/noise characteristics. As described further herein, such binning can benefit users with more flexibility by enabling the setting of different detection sensitivities for different bins and ultimately improving defect detection.

Figure 3:
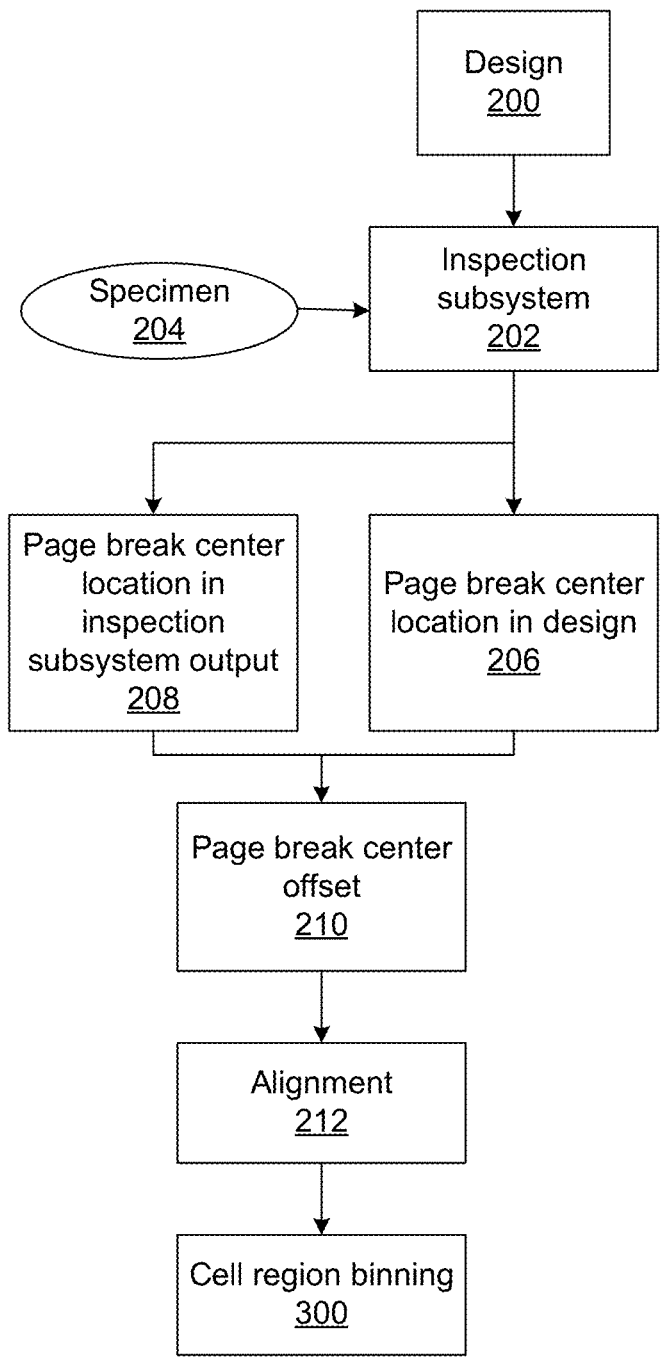

FIG. 3 shows one embodiment for cell region binning. This embodiment includes the steps shown in FIG. 2 in addition to cell region binning step 300. FIG. 6 also shows step 608 in which the computer subsystem(s) bin different regions of cells into different AOIs.

Figure 4:
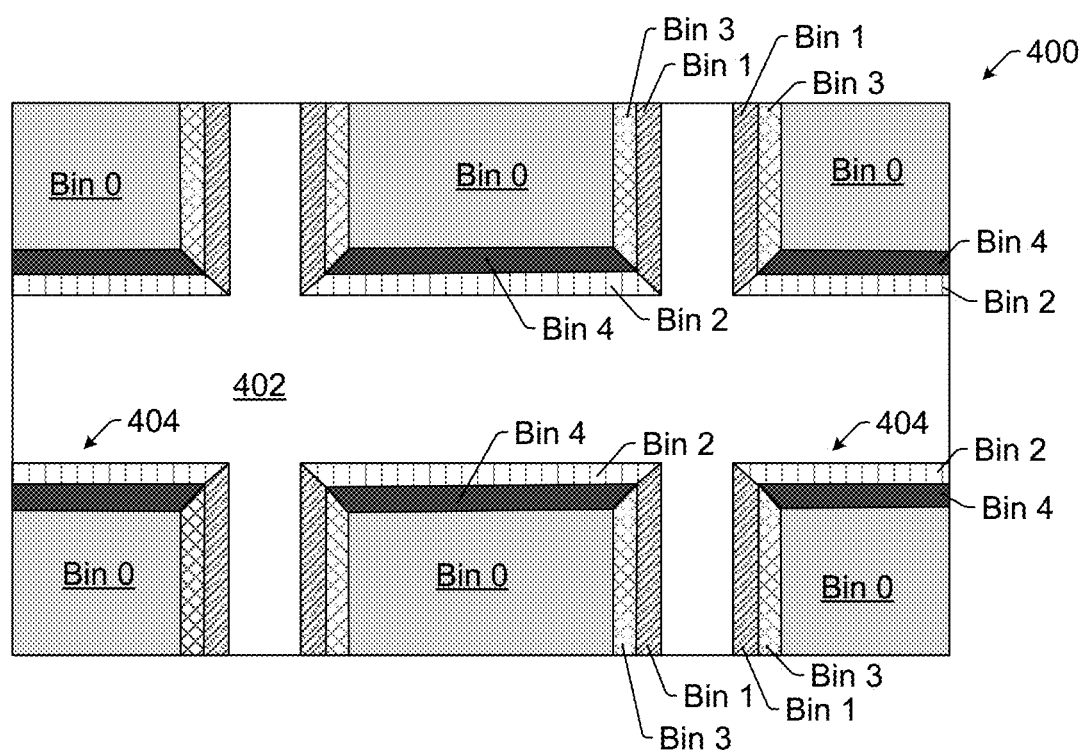
FIG. 4 is a schematic diagram illustrating a plan view of one example of bins defined based on proximity of areas of interest in care areas to edges of cell regions.

In one such embodiment, the AOIs include at least a first AOI that includes an edge region of the cell regions and a second AOI that includes a center region of the cell region. FIG. 4 illustrates one example of cell region bins that may be generated by the cell region binning step described herein. In this example, FIG. 4 shows portion 400 of an array region. The portion of the array region includes page break 402 separating various cell regions 404. The cell regions are separated into a number of bins based on proximity of areas in the cell regions to the edges of the cell regions. For example, as shown in FIG. 4, Bin 0 is defined based on an AOI corresponding to a center region of the cell regions, which is spaced from an edge of the cell regions. The bins also include bins for AOIs closer to the edges of the cell regions, i.e., the edge cell regions, than the center region. In other words, the edge cell regions are positioned between the center region and an edge of the cell regions. In the example shown in FIG. 4, there are two edge cell regions between the center region and each edge of each of the cell regions, but there may be a different number of edge cell regions between the center region and the edge of the cell regions (e.g., 1 edge region, 3 edge regions, and so on). In this example, the edge cell regions include Bins 1 and 3 defined based on different AOIs having different spatial relationships to an edge of the cell regions extending along the y direction and Bins 2 and 4 defined based on different AOIs having different spatial relationships to an edge of the cell regions extending in the x direction. As shown in FIG. 4, Bins 1 and 2 may extend from the edge of the cell regions inward to the center of the cell regions, and Bins 3 and 4 may be spaced from the edge of the cell regions by the width of Bins 1 and 2, respectively, and extend from the edge of Bins 1 and 2, respectively inward to the center of the cell regions.

In some embodiments, one or more characteristics of at least the first and second AOIs are determined based on one or more expected noise characteristics of the output generated in the cell regions. The binning described herein therefore provides a method that allows different sensitivity settings for different noise level regions in the cell regions. For example, the different bins shown in FIG. 4 may be defined based on expected noise characteristics. In particular, Bin 0 corresponding to the center region of the cell regions may be expected to exhibit the lowest noise in the cell regions. Bins 1 and 2 may be expected to exhibit the highest noise because they are adjacent to the edges of the cell regions. Bins 3 and 4 may be expected to exhibit lower noise than the bins closest to the edges of the cell regions because they are spaced from the edges but may be expected to exhibit higher noise than the center regions because these bins are closer to the edges. The edge region bins may be relatively narrow and may extend along the entire edge or nearly the entire edge of the cell region since the noise near the edges of the cell region will generally be relatively high nearest the edges and can quickly change as a function of distance from the cell region edges. Therefore, only a relatively narrow region near the edges of the cell regions may be relatively noisy while a significant center portion of the cell regions may be relatively quiet.

Although FIG. 4 shows two edge cell region bins defined proximate or adjacent to each of the edges of the cell regions, any number of edge cell region bins may be defined by the computer subsystem(s) proximate or adjacent to some or all of the cell region edges. For instance, if only a relatively narrow area of substantially high and relatively uniform noise is expected near an edge of the cell regions, only one edge cell region bin may be defined for that AOI. However, if there is some (or even substantial) variation in the noise as the distance from an edge increases, more than one edge cell region may be defined for that edge so that different edge cell regions correspond to different ranges of noise. In addition, the cell regions may have different noise characteristics proximate different edges. Therefore, different bins may be defined for different edges. For example, there may be only one relatively narrow bin for all edges in the y direction, but two relatively narrow bins for all edges in the x direction. As such, there may be different numbers of edge cell region bins for different edges.

The one or more computer subsystems are also configured for detecting defects in the array region by applying a defect detection method to the portions of the output that correspond to the care areas. Applying a defect detection method to the portions of the output may be performed as described further herein or in any other manner known in the art. In addition, the defect detection method may include any defect detection method known in the art such as MDAT, a defect detection algorithm used by some inspection systems commercially available from KLA, or another suitable commercially available defect detection method and/or algorithm.

Figure 5:
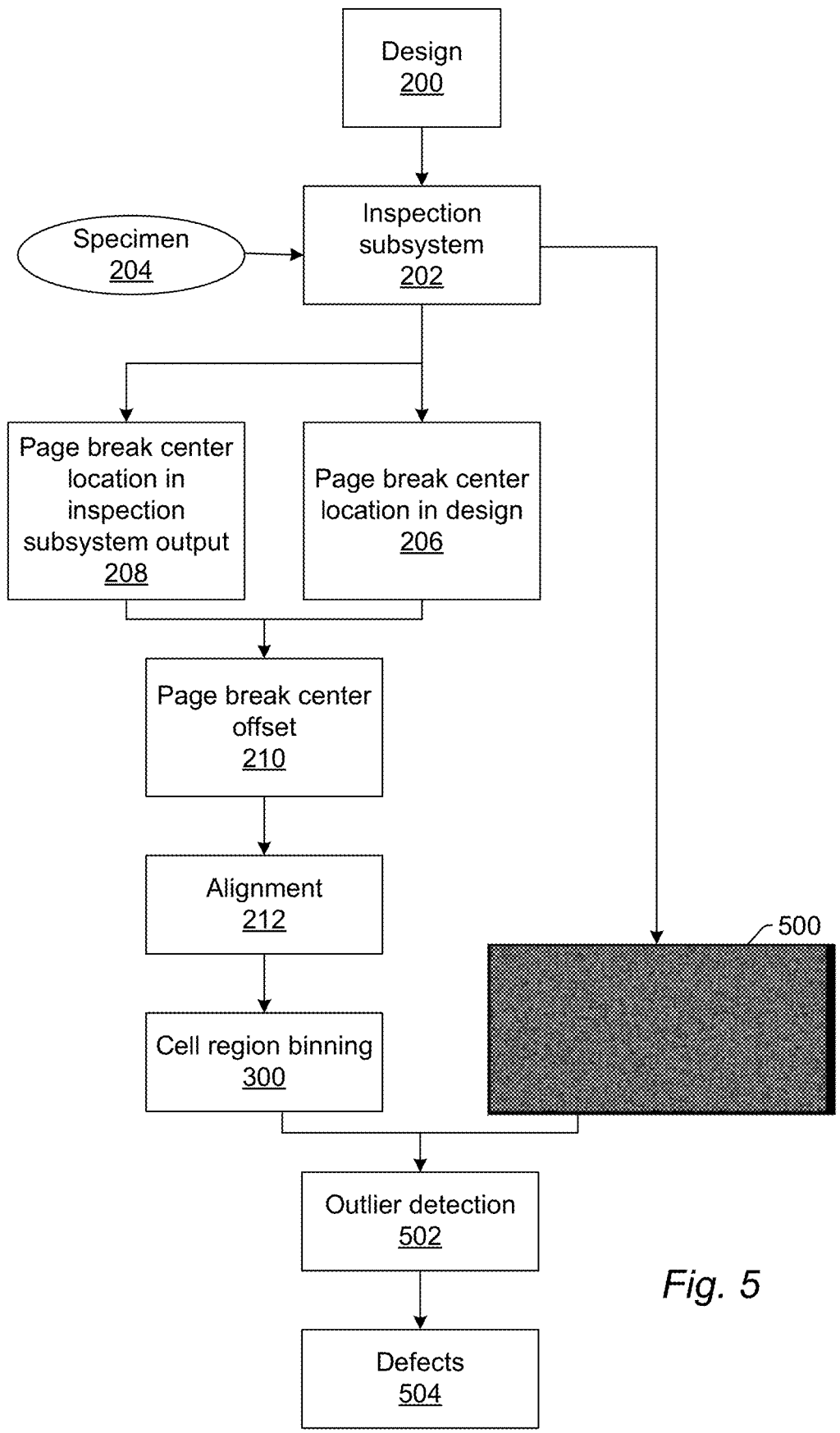

In another embodiment, the defect detection method includes comparing the output generated for different cells in the cell regions to each other, and the different cells are located in the same die. Comparing the different cells to each other may include generating a difference image. For example, the inspection subsystem or one or more computer subsystems may generate output 500, which is shown in FIG. 5 as a difference image generated by subtracting a reference image from the inspection image (thereby essentially comparing the two images). The reference image and the inspection image from which it is subtracted may both be generated for the same cell region on the specimen (and therefore will necessarily be located in the same die on the specimen). For example, the reference and inspection images may be images for different cells in the same cell region. The reference and inspection images may also be images for different cells in different cell regions when one die includes multiple cell regions. Preferably, however, the reference and inspection images are not images for cell regions in different dies since that can introduce noise into the defect detection (since different dies are spaced much farther apart than cells or cell regions in the same die, across specimen variations can cause noise in the comparisons; and different dies may be processed separately in one or more steps such as lithography exposure, which can also cause differences in the dies that can produce noise in the comparisons).

In a further embodiment, the defect detection method is configured for performing the detecting the defects step with one or more different parameters depending on the bins to which the pixels have been assigned. In one such embodiment, the one or more different parameters alter the sensitivity with which the detecting is performed. FIG. 5 illustrates one embodiment of using the binning result to segment the feature axis for an outlier detection algorithm. As shown in FIG. 5, the method may include the steps shown in FIG. 3. The computer subsystem(s) may perform outlier detection 502 using the results generated by cell region binning 300 and difference image 500. In this manner, FIG. 5 shows defect detection with binning result applied.

The outlier detection may include applying a threshold to the difference image and determining that any pixels in the difference image having a value above the threshold correspond to outliers while any pixels in the difference image having a value below the threshold do not correspond to outliers. The outlier detection may also include applying any suitable defect detection method or algorithm to the portions of the output that correspond to the care areas.

The outlier detection may be separately performed for different bins. For example, the difference images may be generated in the same way for each of the different bins, but the difference images may be generated with images from only the same bin. In one such example, only test and reference images generated in an AOI corresponding to Bin 0 may be used to generate difference images for Bin 0, only test and reference images generated in an AOI corresponding to Bin 1 may be used to generate difference images for Bin 1, and so on. In this manner, test and reference images having similar noise characteristics may be subtracted from each other to generate difference images, which may result in quieter difference images overall (since subtracting images with the similar noise characteristics will generally result in less noise in the difference images). In addition, the defect detection that is performed for different bins may be different in one or more parameters. For example, even if the difference images are generated in the same manner (albeit with different inspection and reference images), one or more parameters of the defect detection such as a threshold may be different for different bins. In one such example, since the center regions of the cell regions may be substantially quiet compared to the edge regions, a lower threshold may be applied to the difference images generated for the center region than the edge regions thereby allowing a more sensitive inspection in the center region. In a similar manner, applying a higher threshold to the difference images generated for the edge regions results in a less sensitive inspection in the edge regions but without the prohibitively high levels of nuisance that would be detected with a lower threshold.

The parameter(s) of defect detection that are applied to any of the output in any of the bins may be determined in any suitable manner. In some instances, the parameter(s) may be provided by a user, and the system may include some method or system for receiving the parameter(s) from the user. The parameter(s) may also be determined by the embodiments described herein. In general, however, the parameter(s) that are used for any of the defect detection described herein may be determined in any suitable manner known in the art.

The results of outlier detection 502 may include defects 504. The outliers may themselves be reported as defects; or the outliers that are detected may be defect candidates, and the defect detection may include performing some filtering or nuisance filtering on the defect candidates to separate the defect candidates into defects and nuisances. The defects may then be reported as described further herein.

In one embodiment, the care areas correspond to an entirety of the cell regions in the output, and the portions of the output to which the defect detection method is applied include an entirety of the portions that correspond to the care areas. As described further herein, in some currently used methods, portions of cell regions nearest the edges of the cells are either excluded from inspection entirely or are inspected by a different defect detection method than the rest of the cell regions (e.g., as in a die-to-die comparison type random inspection). However, since the entire cell region can be separated into multiple AOIs depending on noise characteristics across the entire cell region and since different parameters of the same defect detection method can be applied to output generated in different AOIs, the entire cell region may be included in the care areas and inspected by the embodiments described herein.

Figure 7:
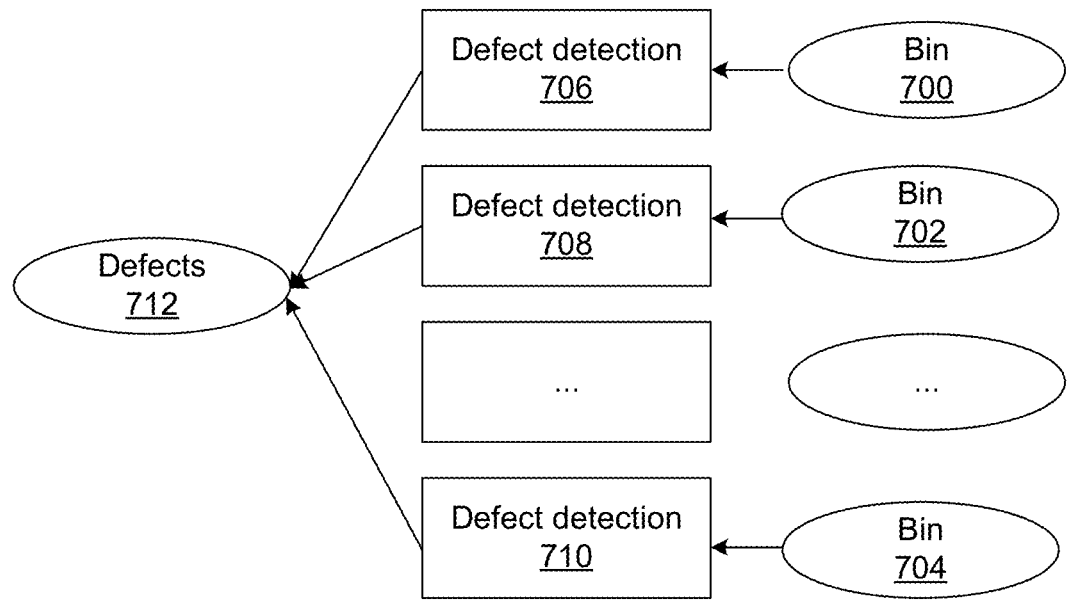

In another embodiment, the one or more computer subsystems are configured for reporting the defects detected in the at least first and second AOIs as a single population of defects. For example, FIG. 6 shows defect detection 610 in which the computer subsystem(s) detect defects separately for each AOI. This defect detection is shown in more detail in FIG. 7. In particular, as shown in FIG. 7, defect detection 706 may be performed for bin 700, defect detection 708 may be performed for bin 702, . . . , and defect detection 710 may be performed for bin 704. In this manner, defect detection may be separately performed for the portions of the output assigned to each bin. The defect detection that is separately performed for different bins may be performed with one or more different parameters such as threshold so that the defects are detected in the different bins with different sensitivities.

All of the defects that are detected in all of the defect detections may then be reported as defects 712. For example, the inspection described herein is not necessarily performed for reporting defects based on how close they are to the edges of the cell regions. Instead, the inspection described herein is generally performed to detect defects in the entire cell region despite varying levels of noise within the cell region. Therefore, although defects may be separately detected in some AOIs within the cell regions, the defects detected in all of the AOIs may be reported as a single defect population. Of course, that single defect population may be reported with information for the defects such as location within the cell region, AOI in which they are located, proximity to the cell edge, etc. so that if the user desires, the computer subsystem(s) could separate the defects into sub-populations based on within cell region location.

The computer subsystem(s) may be configured for storing the information for the detected defects in any suitable computer-readable storage medium. The information may be stored with any of the results described herein and may be stored in any manner known in the art. The storage medium may include any storage medium described herein or any other suitable storage medium known in the art. After the information has been stored, the information can be accessed in the storage medium and used by any of the method or system embodiments described herein, formatted for display to a user, used by another software module, method, or system, etc.

The information for the detected defects may include information such as defect IDs, location, etc., of the bounding boxes of the detected defects, sizes, detection scores, information about defect classifications such as class labels or IDs, etc., or any such suitable information known in the art. The results for the defects may be generated by the computer subsystem(s) in any suitable manner. The results for the defects may have any suitable form or format such as a standard file type. The computer subsystem(s) may generate the results and store the results such that the results can be used by the computer subsystem(s) and/or another system or method to perform one or more functions for the specimen or another specimen of the same type. Such functions include, but are not limited to, altering a process such as a fabrication process or step that was performed on the specimen in a feedback manner, altering a process such as a fabrication process or step that will be performed on the specimen in a feedforward manner, etc.

The embodiments described herein have a number of advantages over other methods and systems for detecting defects in an array region on a specimen. For example, the embodiments described herein introduce a PDA method for DRAM layers where not enough pattern is available for alignment purposes. With the embodiments described herein, the cell region care areas can be placed accurately, and the array detection algorithm can be used for edge cell regions to improve the sensitivity of edge cell regions. The embodiments described herein also introduce a binning method that enables different sensitivity settings for different noise level regions in the cell region, providing the user with more flexibility to control the sensitivity of inspection in different regions.

Each of the embodiments of the system described above may be combined together into one single embodiment. In other words, unless otherwise noted herein, none of the system embodiments are mutually exclusive of any other system embodiments.

Another embodiment relates to a computer-implemented method for detecting defects in an array region on a specimen. The method includes determining a center of a page break in output generated by an inspection subsystem for an array region. The page break separates cell regions in the array region, and the cell regions include repeating patterned features. The inspection subsystem is configured as described above. The method also includes the determining an offset, identifying portions, and detecting defects steps described above. The steps are performed by one or more computer subsystems coupled to the inspection subsystem, which may be configured according to any of the embodiments described herein.

Each of the steps of the method may be performed as described further herein. The method may also include any other step(s) that can be performed by the inspection subsystem and/or computer subsystem(s) described herein. In addition, the method described above may be performed by any of the system embodiments described herein.

Figure 8:
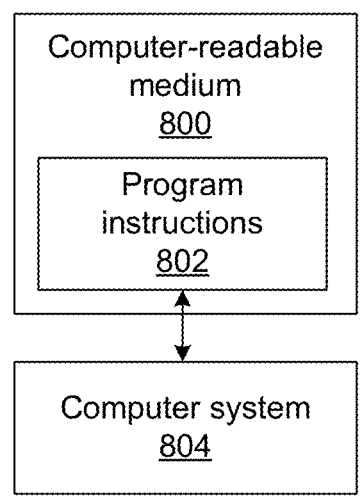
FIG. 8 is a block diagram illustrating one embodiment of a non-transitory computer-readable medium storing program instructions for causing a computer system to perform a computer-implemented method described herein.

An additional embodiment relates to a non-transitory computer-readable medium storing program instructions executable on a computer system for performing a computer-implemented method for detecting defects in an array region on a specimen. One such embodiment is shown in FIG. 8. In particular, as shown in FIG. 8, non-transitory computer-readable medium 800 includes program instructions 802 executable on computer system 804. The computer-implemented method may include any step(s) of any method(s) described herein.

Program instructions 802 implementing methods such as those described herein may be stored on computer-readable medium 800. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system 804 may be configured according to any of the embodiments described herein.

Further modifications and alternative embodiments of various aspects of the invention will be apparent to those skilled in the art in view of this description. For example, methods and systems for detecting defects in an array region on a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain attributes of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured for detecting defects in an array region on a specimen, comprising:
    an inspection subsystem comprising at least an energy source and a detector, wherein the energy source is configured to generate energy that is directed to a specimen, and wherein the detector is configured to detect energy from the specimen and to generate output responsive to the detected to energy; and
    one or more computer subsystems configured for:
        determining a center of a page break in output generated for the specimen in an array region, wherein the page break separates cell regions in the array region, and wherein the cell regions comprise repeating patterned features;
        determining an offset between the center of the page break in the output and a center of the page break in a design for the specimen;
        identifying portions of the output that correspond to care areas in the array region based on the offset; and
        detecting defects in the array region by applying a defect detection method to the portions of the output that correspond to the care areas.

2. The system of claim 1, wherein the one or more computer subsystems are further configured for assigning pixels in the identified portions of the output to bins defined based on proximity of areas of interest in the care areas to edges of the cell regions.

3. The system of claim 2, wherein the areas of interest comprise at least a first area of interest comprising an edge region of the cell regions and a second area of interest comprising a center region of the cell regions.

4. The system of claim 3, wherein one or more characteristics of at least the first and second areas of interest are determined based on one or more expected noise characteristics of the output generated in the cell regions.

5. The system of claim 3, wherein the one or more computer subsystems are further configured for reporting the defects detected in at least the first and second areas of interest as a single population of defects.

6. The system of claim 2, wherein the defect detection method is configured for performing said detecting defects with one or more different parameters depending on the bins to which the pixels have been assigned.

7. The system of claim 6, wherein the one or more different parameters alter the sensitivity with which said detecting is performed.

8. The system of claim 1, wherein the care areas correspond to an entirety of the cell regions in the output, and wherein the portions of the output to which the defect detection method is applied comprise an entirety of the portions that correspond to the care areas.

9. The system of claim 1, wherein the defect detection method comprises comparing the output generated for different cells in the cell regions to each other, and wherein the different cells are located in the same die.

10. The system of claim 1, wherein the output corresponding to the page break is saturated.

11. The system of claim 1, wherein the output generated in the array region is not responsive to any features in the page break suitable for image alignment, and wherein the cell regions do not contain any features that are suitable for the image alignment.

12. The system of claim 1, wherein determining the center of the page break comprises determining a first center of the page break along a first dimension of the page break and determining a second center of the page break along a second dimension of the page break orthogonal to the first dimension.

13. The system of claim 1, wherein determining the center of the page break comprises image projection in first and second dimensions orthogonal to each other on the specimen.

14. The system of claim 1, wherein during a setup phase, the one or more computer subsystems are further configured for identifying one or more page break targets in a setup image acquired by the inspection subsystem for the specimen or another specimen, acquiring information for the one or more page break targets from the design for the specimen, determining one or more characteristics of the one or more page break targets from the information, and storing the identified one or more page break targets and the determined one or more characteristics of the one or more page break targets in a storage medium.

15. The system of claim 1, wherein the array region forms part of a memory device being fabricated on the specimen.

16. The system of claim 1, wherein the specimen comprises a wafer.

17. The system of claim 1, wherein the inspection subsystem is configured as a light-based inspection subsystem.

18. The system of claim 1, wherein the inspection subsystem is configured as an electron beam based inspection subsystem.

19. A non-transitory computer-readable medium, storing program instructions executable on a computer system for performing a computer-implemented method for detecting defects in an array region on a specimen, wherein the computer-implemented method comprises:
    determining a center of a page break in output generated by an inspection subsystem for a specimen in an array region, wherein the page break separates cell regions in the array region, wherein the cell regions comprise repeating patterned features, wherein the inspection subsystem comprises at least an energy source and a detector, wherein the energy source is configured to generate energy that is directed to a specimen, and wherein the detector is configured to detect energy from the specimen and to generate output responsive to the detected energy;
    determining an offset between the center of the page break in the output and a center of the page break in a design for the specimen;
    identifying portions of the output that correspond to care areas in the array region based on the offset; and
    detecting defects in the array region by applying a defect detection method to the portions of the output that correspond to the care areas, wherein said determining the center, determining the offset, identifying the portions, and detecting the defects are performed by the computer system.

20. A computer-implemented method for detecting defects in an array region on a specimen, comprising:
    determining a center of a page break in output generated by an inspection subsystem for a specimen in an array region, wherein the page break separates cell regions in the array region, wherein the cell regions comprise repeating patterned features, wherein the inspection subsystem comprises at least an energy source and a detector, wherein the energy source is configured to generate energy that is directed to a specimen, and wherein the detector is configured to detect energy from the specimen and to generate output responsive to the detected energy;
    determining an offset between the center of the page break in the output and a center of the page break in a design for the specimen;
    identifying portions of the output that correspond to care areas in the array region based on the offset; and
    detecting defects in the array region by applying a defect detection method to the portions of the output that correspond to the care areas, wherein said determining the center, determining the offset, identifying the portions, and detecting the defects are performed by one or more computer systems coupled to the inspection subsystem.

* * * * *